(12) United States Patent
Nguyen

(10) Patent No.: US 6,270,561 B1
(45) Date of Patent: Aug. 7, 2001

(54) HOT MELT INK COMPOSITIONS FOR INKJET PRINTING APPLICATIONS

(75) Inventor: My T. Nguyen, Kirkland (CA)

(73) Assignee: American Dye Source, Inc., Baie d'Urfé (CA)

( * ) Notice: Subject to any disclaimer, the term of this patent is extended or adjusted under 35 U.S.C. 154(b) by 0 days.

(21) Appl. No.: 09/450,022

(22) Filed: Nov. 29, 1999

(30) Foreign Application Priority Data

Oct. 15, 1999 (CA) .................................................. 2286446

(51) Int. Cl.⁷ ............................ C09D 11/10; C09D 11/00
(52) U.S. Cl. .................................... 106/31.85; 106/31.13; 106/31.29; 106/31.57; 106/31.61; 106/287.1; 106/311; 523/161; 524/588; 525/474
(58) Field of Search ....................... 106/31.13, 31.29, 106/31.57, 31.61, 31.85, 287.1, 311; 523/161; 524/588; 525/474

(56) References Cited

U.S. PATENT DOCUMENTS

| | | |
|---|---|---|
| 2,844,550 * | 7/1958 | Hay . |
| 4,889,560 | 12/1989 | Jaeger et al. . |
| 5,597,856 | 1/1997 | Yu et al. . |
| 5,703,145 * | 12/1997 | Sagawa et al. ................ 523/161 |
| 5,750,604 | 5/1998 | Banning et al. . |
| 5,777,023 | 7/1998 | Parlin . |
| 5,780,528 | 7/1998 | Titterington et al. . |
| 5,783,658 | 7/1998 | Banning et al. . |
| 5,881,648 | 3/1999 | Pavlin . |
| 5,902,841 | 5/1999 | Jaeger et al. . |
| 6,153,667 * | 11/2000 | Howald ....................... 523/160 |

FOREIGN PATENT DOCUMENTS

| | | |
|---|---|---|
| 56-111691 * | 9/1981 | (JP) . |
| 62-250081 * | 10/1987 | (JP) . |
| WO 9414902 | 7/1994 | (WO) . |
| WO 9712003 | 4/1997 | (WO) . |

OTHER PUBLICATIONS

Derwent abstract of JP 356111691 A, Nakatani et al. 9/81.*
Derwent abstract of JP 62250081 A, Toyo INK MFG CO 10/87.*
Derwent abstract of JP 02284970 A, Union Chemicer KK 3/98.*

* cited by examiner

Primary Examiner—Robert Dawson
Assistant Examiner—Jeffrey B. Robertson
(74) Attorney, Agent, or Firm—Goudreau Gage Dubuc

(57) ABSTRACT

Disclosed herein is a novel hot melt ink comprising a colorant ink and an ink vehicle wherein the ink vehicle comprises at least one polyhedral silsesquioxane compound present in a proportion of about 0.1 to 30 wt % based on the total weight of the hot melt ink composition.

8 Claims, No Drawings

HOT MELT INK COMPOSITIONS FOR INKJET PRINTING APPLICATIONS

FIELD OF THE INVENTION

This invention relates to hot melt ink compositions for two- and three-dimensional inkjet printing applications. More particularly, this invention relates to hot melt ink compositions comprising materials that contain silsesquioxane compounds and reactive moieties such as aniline, pyrrole and thiophene.

This invention also relates to optional post printing treatment processes to increase mechanical properties, optical density, electrical conductivity and dryness of the printed images and objects.

BACKGROUND OF THE INVENTION

Hot melt inks for inkjet printing are characterized by being solid at ambient temperature and liquid at printer operating temperature. Hot melt inks are advantageous over liquid ink because transportation is easier, solvent evaporation and viscosity changes are of no concern. Hot melt inks provide better print quality and resolution since the inks solidify and dry more quickly without wicking into the substrate.

Thus, solid hot melt inks are loaded in a printer capable of melting the ink in the inkjet printer head, ejecting the liquid ink which quickly resolidifies upon impacting a substrate. Conventional hot melt inkjet printers operate with a printing head and inkjet temperature of about 120 to about 150 C. At those temperatures, the solid ink is melted to a low viscosity liquid, generally about 8 to 25 cP when measured at jetting temperature. To form a three-dimensional solid object, the ink jet operation is repeated over several passes so that an object is formed layer by layer.

Hot melt inks generally comprise colorant inks such as dyes and pigments along with base materials commonly referred to as ink vehicles. Conventional ink vehicles generally include various proportions of resins, plasticizers, tackifiers, viscosity modifiers and antioxidants.

PCT patent application WO 9414902 describes hot melt inks for inkjet printing which comprise colorants and urethane oligomers as ink vehicles and which were obtained by reacting diisocyanate compounds with various aliphatic alcohol.

PCT patent application WO 9712003 describes hot melt inks for inkjet printing which comprise colorants and ink vehicle and which were obtained by reacting a mono- or diisocyanate with one or more functional amide materials.

U.S. Pat. No. 4,889,560 teaches the preparation of hot melt inks comprising colorants and an ink vehicle. The ink vehicle is described as containing fatty mono-amide and tetra-amide compounds. The ratio of tetra-amide to mono-amide varies between 2 to 1 and 1 to 10.

U.S. Pat. No. 5,597,856 teaches the preparation of hot melt inks comprising colorants and an ink vehicle. The ink vehicle is described as containing a mixture of mono-amide, unsaturated amide and tetra-amide compounds.

U.S. Pat. Nos. 5,750,604; 5,780,528; and 5,783,658 teach the preparation of hot melt inks for inkjet printing which comprise colorants and ink vehicles containing urethane-urea and urea-urea compounds.

U.S. Pat. No. 5,902,841 teaches the preparation of hot melt inks comprising colorants and an ink vehicle. The ink vehicle is described as containing hydroxy functional fatty amide compounds.

U.S. Pat. Nos. 5,777,023 and 5,881,648 teach the preparation of hot melt inks comprising colorants and an ink vehicle. The ink vehicle is described as containing diamid-ediurethane compounds obtained by reacting monoamine and diisocyanate or diamine and isocyanate.

Although meritorious, the hot melt inks for inkjet printing processes taught in the prior art suffer multiple drawbacks and disadvantages once jetted on a substrate, such as poor mechanical properties and tackiness upon touch.

Furthermore, none of the prior art hot melt inks contain silicon-based materials such as the polyhedral silsesquioxanes described in the present invention.

As a result, there remains an important need for new hot melt ink compositions with improved dryness to touch and improved mechanical properties. Also needed are novel hot melt ink jet compositions allowing for post printing treatment processes to further increase mechanical durability, optical density, electrical conductivity and dryness.

SUMMARY OF THE INVENTION

This invention relates hot melt ink compositions for two- and three-dimensional inkjet printing applications. The hot melt ink compositions of this invention comprise colorants and ink vehicle.

The first aspect of this invention is related to the ink vehicle for the hot melt ink compositions comprising silsesquioxanes to provide excellent mechanical properties as well as dry, non-tacky printed images and objects. Thus, there is provided a hot melt ink comprising a colorant ink and an ink vehicle wherein the ink vehicle comprises at least one polyhedral silsesquioxane compound present in a proportion of about 0.1 to 30 wt % based on the total weight of the hot melt ink composition.

Another aspect of this invention is also related to the ink vehicle for the hot melt compositions. The ink vehicle comprises, in addition to silsesquioxane compounds, molecular, oligomeric or polymeric materials, which contain reactive moieties, such as aniline, diphenylamine, pyrrole, thiophene and their substituted derivatives. These reactive moieties allow the printing images and objects to undergo crosslinking reactions and polymerization via post treatment processes to increase further mechanical properties, optical density, electrical conductivity and dryness.

Another aspect of this invention is related to the post treatment processes of the printing images or objects. The post treatment processes can be achieved by contacting the printing images or objects with aqueous or organic solutions containing oxidizing agents such as ammonium persulfate, iron chloride and copper perchlorate or other suitable oxidizing agents. Furthermore, the post treatment process can be employed to deposit a thin layer of copper, silver, tin or other metals on the printed ink images or objects by electroless deposition techniques.

DETAILED DESCRIPTION OF THE INVENTION

This invention relates hot melt ink compositions for two- and three-dimensional inkjet printing applications. The hot melt ink compositions of this invention comprise colorants and ink vehicle.

Hot melt inks generally comprise colorant inks such as dyes and pigments along with base materials commonly referred to as ink vehicles. Conventional ink vehicles generally include various proportions of resins, plasticizers, tackifiers, viscosity modifiers and antioxidants.

It is of course to be understood that a variety of known compounds could be used as resins, plasticizers, tackifiers, viscosity modifiers or antioxidants. Viscosity modifiers are generally low viscosity compounds, preferably less than 5 Cp which help lower the overall viscosity of the ink vehicle. Of course, some compounds used in the ink vehicle can play more than one role, for example a commercially available tackifier such as Cellolyn 21 (available from RHO Chemicals) can play a dual role of plasticizer and tackifier.

The first aspect of this invention is related to the ink vehicle for the hot melt ink compositions comprising silsesquioxanes or oligomers and polymers that contain silsesquioxane moieties. The presence of silsesquioxanes in the ink vehicle provides excellent mechanical properties and non-tacky printed images and objects.

Silsesquioxanes are polyhedral siloxane cage (commonly called POSS) that are generally characterized by the formula $[RSiO_{3/2}]_n$, where n is an even number greater than 4 and R may be hydrogen as well as inorganic or organic substitutents. Silsesquioxanes are generally obtained via hydrolysis of trichlorosilanes or trialkoxysilanes. A comprehensive review of the synthesis and properties of silsesquioxanes was published by R. Baney, M. Ito, A. Sakasibara and T. Suzuki in Chemical Review, 1995, 95, 1409–1430.

Preferred silsesquioxanes, oligomers and polymers containing silsesquioxane moieties of this invention are waxy or solid powder having a melting point between 30 and 140° C. Examples of preferred silsesquioxanes of this invention are:

1,3,5,7,9,11,13,15-Octaalkylpentacyclo-$[9.5.1.1^{3,9}.1^{5,15}.1^{7,13}]$-siloxane, where alkyl is C4–C30 linear, branched or cyclic hydrocarbon chain.

1,3,5,7,9,11,13,15-Octakis(alkyldimethylsilyloxy) pentacyclo-$[9.5.1.1^{3,9}.1^{5,15}.1^{7,13}]$-siloxane, where alkyl is C4–C30 linear, branched or cyclic hydrocarbon chain.

1,3,5,7,9,11,13,15-Octakis(trimethylsiloxane) propylpentacyclo-$[9.5.1.1^{3,9}.1^{5,15}.1^{7,13}]$-siloxane.

1,3,5,7,9,11,13,15-Octakis(pentamethyldisiloxane) propylpentacyclo-$[9.5.1.1^{3,9}.1^{5,15}.1^{7,13}]$-siloxane.

1-(3-(N-anilino)propyl)-3,5,7,9,11,13,15-heptaalkylpentacyclo-$[9.5.1.1^{3,9}.1^{5,15}.1^{7,13}]$-siloxane, where alkyl is C4–C30 linear, branched or cyclic hydrocarbon chain.

1-(3-(1-pyrrole)propyl)-3,5,7,9,11,13,15-heptaalkylpentacyclo-$[9.5.1.1^{3,9}.1^{5,15}.1^{7,13}]$-siloxane, where alkyl is C4–C30 linear, branched or cyclic hydrocarbon chain.

1-(3-(2-thienyl)propyl)-3,5,7,9,11,13,15-heptaalkylpentacyclo-$[9.5.1.1^{3,9}.1^{5,15}.1^{7,13}]$-siloxane, where alkyl is C4C30 linear, branched or cyclic hydrocarbon chain.

1-(3-(N-diphenylamino)propyl)-3,5,7,9,11,13,15-heptaalkylpentacyclo-$[9.5.1.1^{3,9}.1^{5,15}.1^{7,13}]$-siloxane, where alkyl is C4–C30 linear, branched or cyclic hydrocarbon chain.

1,3,5,7,9,11,13-octakis(methoxypropyl-1,2-butoxylate-block-ethoxylate)pentacyclo$[9.5.1.1^{3,9}.1^{5,15}.1^{7,13}]$ octasiloxane.

1,3,5,7,9,11,13-octakis(hydroxypropyl-1,2-butoxylate-block-ethoxylate)pentacyclo$[9.5.1.1^{3,9}.1^{5,15}.1^{7,13}]$ octasiloxane.

1,3,5,7,9,11,13-octakis(methoxyethoxyethoxyl) propylpentacyclo$[9.5.1.1^{3,9}.1^{5,15}.1^{7,13}]$-octasiloxane.

1,3,5,7,9,11,13-octakis(methoxypropoxylate) propylpentacyclo$[9.5.1.1^{3,9}.1^{5,15}.1^{7,13}]$-octasiloxane.

1-[3-(1,3-propanediol-2-ethyl-2-methoxy) propyidimethylsiloxy]-3,5,7,9,11,13,15-heptacyclopentylpentacyclo-$[9.5.1.1^{3,9}.1^{5,15}.1^{7,13}]$-octasiloxane.

1-[2-methyl-2-hydroxy)butyldimethylsiloxy]-3,5,7,9,11,13,15-heptacyclopentylpentacyclo-$[9.5.1.1^{3,9}.1^{5,15}.1^{7,13}]$-octasiloxane.

POSS-Bisphenol A-Urethane polymer.
Poly(styrylPOSS-co-styrene).
Poly(dimethyl-co-methylhydrido-co-methylpropylPOSS) siloxane.

The amount of silsesquioxane or oligomers and polymers containing silsesquioxane present in the ink vehicle for the hot melt ink of the present invention is preferred to be between about 0.1 and 30 wt % calculated on the total weight of the composition.

The second aspect of this invention is related to the ink vehicle for the hot melt compositions comprising molecular, oligomeric or polymeric materials, which contain reactive moieties, such as aniline, diphenylamine, pyrrole, thiophene and their substituted derivatives. These reactive moieties allow the printing images and objects to undergo crosslinking reactions and polymerization via post treatment processes to further increase mechanical properties, optical density, electrical conductivity and dryness.

Materials containing aniline, diphenylamine, pyrrole, thiophene and their substituted derivatives are known to undergo polymerization to form high molecular weight conjugated polymers. Polymerizations of these materials are usually performed in aqueous or organic solutions containing oxidizing agents such as ammonium persulfate, iron chloride and copper perchlorate or other suitable oxidizing agent. The obtained polymers exhibit excellent physical properties, optical properties and electrical conductivity.

Preferred materials containing reactive moieties derived from aniline, diphenylamine, pyrrole, thiophene and their substituted derivatives thereof of this invention are amide, ester, ether, urethane, amide-ester, amide-urethane and ester-urethane having a molecular weight between 200 and 1,000,000. These materials are preferred to have a melting point between 40 and 150° C.

The third aspect of this invention is related to the post treatment processes of the printed images or objects. The post treatment processes can be achieved by contacting the printed images or objects with aqueous or organic solutions containing oxidizing agents such as ammonium persulfate, iron chloride and copper perchlorate. After treatment, the printing images or objects are washed with water to remove excess oxidizing agents. Furthermore, the post treatment process can allow a thin layer of copper, silver, tin or other metals deposited on the images or objects by an electroless deposition technique. U.S. Pat. No. 5,846,606 to Wessling teaches a suitable electroless metal deposition process, the disclosure of which is incorporated herein by reference.

Synthesis of Silsesquioxanes (Poss) Materials

Silsesquioxane compounds of this invention were synthesized according to the method published by C. Bolln and coworkers in Chemistry of Materials, Volume 9, Number 6, pages 1475–1480. All the syntheses were performed in a three-neck glass reactor, which was equipped with heating mental, magnetic stirrer, water condenser and nitrogen inlet. The platinum catalyst employed in this invention was prepared containing 3 weight percent of hexachloroplatinic acid in diglyme. The completeness of the reactions was followed using a FTIR Spectrophotometer (Perkin-Elmer, Model 1760) by following the disappearance of the Si-H band at around 2250 $cm^{-1}$. The melting point of the products were determined using a differential scanning calorimeter (Instrument Specialist Incorporated, Model DSC 550).

EXAMPLE 1

Synthesis of 1,3,5,7,9,11,13-octadecylpentacyclo[9.5.1.1$^{3,9}$.1$^{5,15}$.1$^{7,13}$]octasiloxane About 4.3 parts of 1,3,5,7,9,11,13-octahydridopentacyclo[9.5.1.1$^{3,9}$.1$^{5,15}$.1$^{7,13}$]-octasiloxane (available from American Dye Source, Inc.) and 11.2 parts of 1-decene (available from Aldrich Chemical) were dissolved in 100 ml of dry toluene. Platinum catalyst solution (100 μL) was then added. The reaction solution was heated to 80–90° C. for 16 hours under constant stirring and nitrogen atmosphere. After the reaction was completed, the solution was filtered twice through a mixture of silica gel and charcoal (5:1) and then filtered several times through silica gel until the solution become colorless. The solvent was removed to dryness by using rotary evaporator to give a white powder having a melting around 61.0° C. with 72% yield.

EXAMPLE 2

Synthesis of 1-(3-anilinopropyl)-3,5,7,9,11,13-heptadecylpentacyclo[9.5.1.1$^{3,9}$.1$^{5,15}$.1$^{7,13}$]-octasilioxane About 4.3 parts of 1-(3-anilinopropyl)-3,5,7,9,11,13-heptahydridopentacyclo[9.5.1.1$^{3,9}$.1$^{5,15}$.1$^{7,13}$]-octasiloxane (available from American Dye Source, Inc.), 1.4 parts of N-allyaniline (available from Aldrich Chemical) and 9.8 parts of 1-decene (available from Aldrich Chemical) were dissolved in 100 ml of dry toluene. Platinum catalyst solution (100 μL) was then added. The reaction solution was heated to 80–90° C. for 16 hours under constant stirring and nitrogen atmosphere. After the reaction was completed, the solution was filtered twice through a mixture of silica gel and charcoal (5:1) and then filtered several times through silica gel until the solution become colorless. The solvent was removed to dryness by using rotary evaporator to give a white powder having a melting around 67.0° C. with 67% yield.

EXAMPLE 3

Synthesis of 1-(3-(N-pyrrole)propyl)-3,5,7,9,11,13-heptadecylpentacyclo[9.5.1.1$^{3,9}$.1$^{5,15}$.1$^{7,13}$]-octasiloxane About 4.3 parts of 1-(3-(N-pyrrole)propyl)-3,5,7,9,11,13-heptahydridopentacyclo[9.5.1.1$^{3,9}$.1$^{5,15}$.1$^{7,13}$]-octasiloxane (available from American Dye Source, Inc.), 1.1 parts of N-allypyrrole (available from American Dye Source, Inc.) and 9.8 parts of 1-decene (available from Aldrich Chemical) were dissolved in 100 ml of dry toluene. Platinum catalyst solution (100 μL) was then added. The reaction solution was heated to 80–90° C. for 16 hours under constant stirring and nitrogen atmosphere. After the reaction was completed, the solution was filtered twice through a mixture of silica gel and charcoal (5:1) and then filtered several times through silica gel until the solution become colorless. The solvent was removed to dryness by using rotary evaporator to give a white powder having a melting around 70.0° C. with 78% yield.

EXAMPLE 4

Synthesis of 1-(3-(2-thienyl)propyl)-3,5,7,9,11,13-heptadecylpentacyclo[9.5.1.1$^{3,9}$.1$^{5,15}$.1$^{7,13}$]-octasiloxane About 4.3 parts of 1-(3-(2-thienyl)propyl)-3,5,7,9,11,13-heptadeclpentacyclo[9.5.1.1$^{3,9}$.1$^{5,15}$.1$^{7,13}$]-octasiloxane (available from American Dye Source, Inc.), 1.5 parts of 2-allythiophene (available from American Dye Source, Inc.) and 9.8 parts of 1-decene (available from Aldrich Chemical) were dissolved in 100 ml of dry toluene. Platinum catalyst solution (100 μL) was then added. The reaction solution was heated to 80–90° C. for 16 hours under constant stirring and nitrogen atmosphere. After the reaction was completed, the solution was filtered twice through a mixture of silica gel and charcoal (5:1) and then filtered several times through silica gel until the solution become colorless. The solvent was removed to dryness by using rotary evaporator to give a white powder having a melting around 67.0° C. with 65% yield.

EXAMPLE 5

Synthesis of 1,3,5,7,9,11,13-octakis(octyidimethylsilyloxy)pentacyclo-[9.5.1.1$^{3,9}$.1$^{5,15}$.1$^{7,13}$]octasiloxane About 10.2 parts of 1,3,5,7,9,11,13-octakis(dimethylsilyloxy)pentacyclo-[9.5.1.1$^{3,9}$.1$^{5,15}$.1$^{7,13}$]-octasiloxane (available from Aldrich Chemical, Inc.) and 12.0 parts of 1-octene (available from Aldrich Chemical) were dissolved in 100 ml of dry toluene. Platinum catalyst solution (100 μL) was then added. The reaction solution was heated to 80–90° C. for 16 hours under constant stirring and nitrogen atmosphere. After the reaction was completed, the solution was filtered twice through a mixture of silica gel and charcoal (5:1) and then filtered several times through silica gel until the solution become colorless. The solvent was removed to dryness by using rotary evaporator to give a clear waxy solid with 60% yield.

Synthesis of Materials Containing Reactive Moieties

The synthesis of reactive moieties materials were performed in a glass kettle equipped with heating metal, temperature controller, mechanical stirrer, water condenser and nitrogen gas inlet. The completeness of the reactions was followed using a FTIR Spectrophotometer (Perkin-Elmer, Model 1760). The melting point of the products were determined using a differential scanning calorimeter (Instrument Specialist Incorporated, Model DSC 550). The viscosity of the obtained products was measured using a high temperature viscometer (Brookfield, Model DV-II+).

EXAMPLE 6

Synthesis of Urethane Compound Containing Aniline Reactive Moiety

About 137.2 parts of 2-anilinoethanol (available from Aldrich Chemical) and 295.5 parts of 1-octadecylisocyanate (available from Bayer) were added into the reaction kettle. The reaction was heated to 60° C. and five drops of dibutyltin dilaurate (available from Aldrich Chemical) was added as a reaction catalyst. The temperature of the reaction was raised to 140° C. and stirred for 1 hour. After cooled to room temperature, a white solid product was obtained having a melting point at 45° C. and viscosity of 6.2 cP at 135° C.

EXAMPLE 7

Synthesis of Urethane Compound Containing Aniline Reactive Moiety

About 344.1 parts of Abitol-E (available from Hercules), 137.2 parts of 2-anilinoethanol (available from Aldrich Chemical) and 222.3 parts of isophorone diisocyanate (available from Bayer) were added into the reaction kettle. The reaction was heated to 60° C. and three drops of dibutyltin dilaurate was added as a reaction catalyst. The temperature of the reaction was raised to 140° C. and stirred for 1 hour. After cooled to room temperature, a clear solid product was obtained having a melting point at around 69° C. and viscosity of 783 cP at 135° C.

EXAMPLE 8

Synthesis of Urethane Compound Containing Aniline Reactive Moiety

About 270.5 parts of 1-octadecanol (available from Aldrich Chemical), 137.2 parts of 2-anilinoethanol (available from Aldrich Chemical) and 222.3 parts of isophorone diisocyanate (available from Bayer) were added into the reaction kettle. The reaction was heated to 60° C. and three drops of dibutyltin dilaurate was added as a reaction catalyst. The temperature of the reaction was raised to 140° C. and stirred for 1 hours. After cooled to room temperature, a translucent solid product was obtained having a melting point at around 47° C. and viscosity of 33.5 cP at 135° C.

EXAMPLE 9

Synthesis of Ester-urethane Compound Containing Aniline Reactive Moiety

About 204.0 parts of 3hydroxy-2,2-dimethylpropyl-3-hydroxy-2,2-dimethylpropionate (available from Aldrich Chemical), 274.4 parts of 2-anilinoethanol (available from Aldrich Chemical) and 444.4 parts of isophorone diisocyanate (available from Bayer) were added into the reaction kettle. The reaction was heated to 60° C. and five drops of dibutyltin dilaurate was added as a reaction catalyst. The temperature of the reaction was raised to 140° C. and stirred for 3 hours. After cooled to room temperature, a translucent solid product was obtained having a melting point at around 136° C. and viscosity of around 445 cP at 150° C.

EXAMPLE 10

Synthesis of Amide-urethane Compound Containing Aniline Reactive Moiety

About 342 parts of 2-hydroxyethyl stearylamide (Monamid S, available from Rona), 137 parts of 2-anilinoethanol (available from Aldrich Chemical) and 222 parts of isophorone diisocyanate (available from Bayer) were added into the reaction kettle. The reaction was heated to 60° C. and five drops of dibutyltin dilaurate was added as a reaction catalyst. The temperature of the reaction was raised to 140° C. and stirred for 1 hours. After cooled to room temperature, a clear hard solid product was obtained having a melting point at around 78° C. and viscosity of 118 cP at 135° C.

EXAMPLE 11

Synthesis of Urethane Compound Containing Pyrrole Reactive Moiety

About 111 parts of 2-(1-pyrrole)ethanol (available from American Dye Source, Inc.) and 295.5 parts of 1-octadecylisocyanate (available from Bayer) were added into the reaction kettle. The reaction was heated to 60° C. and three drops of dibutyltin dilaurate was added as a reaction catalyst. The temperature of the reaction was raised to 140° C. and stirred for 3 hours. After cooled to room temperature, a white solid product was obtained having a melting point at 45° C. and viscosity of 5.8 cP at 135° C.

EXAMPLE 12

Synthesis of Urethane-amide Compound Containing Pyrrole Reactive Moiety

About 342 parts of 2-hydroxyethyl stearylamide (Monamid S, available from Rona), 137 parts of 2-(1-pyrrole)ethanol (available from American Dye Source, Inc.) and 222 parts of isophorone diisocyanate (available from Bayer) were added into the reaction kettle. The reaction was heated to 60° C. and five drops of dibutyltin dilaurate was added as a reaction catalyst. The temperature of the reaction was raised to 140° C. and stirred for 1 hours. After cooled to room temperature, a clear hard solid product was obtained having a melting point at around 72° C. and viscosity of 97 cP at 135° C.

EXAMPLE 13

Synthesis of Urethane Compound Containing Thiophene Reactive Moiety

About 12.8 parts of 2-(2-thienyl)ethanol (available from Aldrich Chemical) and 29.5 parts of 1-octadecylisocyanate (available from Bayer) were added into the reaction kettle. The reaction was heated to 60° C. and three drops of dibutyltin dilaurate was added as a reaction catalyst. The temperature of the reaction was raised to 140° C. and stirred for 1 hour. After cooled to room temperature, a white solid product was obtained having a melting point at 42° C. and viscosity of 5.4 cP at 135° C.

EXAMPLE 14

Synthesis of Urethane-amide Compound Containing Thiophene Reactive Moiety

About 342 parts of 2-hydroxyethyl stearylamide (Monamid S, available from Rona), 128 parts of 2-(2-thienyl)ethanol (available from Aldrich Chemical) and 222 parts of isophorone diisocyanate (available from Bayer) were added into the reaction kettle. The reaction was heated to 60° C. and five drops of dibutyltin dilaurate was added as a reaction catalyst. The temperature of the reaction was raised to 140° C. and stirred for 1 hours. After cooled to room temperature, a clear hard solid product was obtained having a melting point at around 70° C. and viscosity of 92 cP at 135° C.

Preparation of Hot Melt Ink for Inkjet Printing Applications

The hot melt inks were prepared in a stainless steel kettle equipped with heating mental, temperature controller and mechanical stirrer. The ink vehicle was prepared by melting together all the ingredients at the temperature between 120 and 140° C. under constant stirring for thirty minutes. The colorant was then added into the melted ink vehicle, which was continued to stir for additional thirty minutes at 120° C. The hot melt ink was then filtered using a home-built filtration apparatus through a Whatman 1.0 µm absolute glass microfiber filter at a pressure of about 15 psi.

EXAMPLE 15

Hot Melt Ink Composition with Silsesquioxane

The hot melt ink composition was prepared containing 5 parts of silsesquioxane compound from Example 1, 57 parts of carbamic acid, octadecyl, hexadecyl ester as viscosity modifier (available from American Dye Source, Inc.), 15 parts of polyamide resin (ADS8530, available from American Dye Source, Inc.), 20 parts of tackifier (Cellolyn 21, from RHO Chemicals), 2.5 parts of solvent black 27 (Sylvanyl NS, available from Clariant) and 0.5 parts of antioxidant (Naugard 431 and 76, available from Uniroyal Chemical). The viscosity of this hot melt ink composition is 13.2 cP at 135° C. The ink was loaded in the Tektronix Phaser 840 printer to print text and image on paper and transparency. The printing text and image show excellent quality and adhere well to the substrate as well as being non-tacky upon touch.

EXAMPLE 16

Hot Melt Ink Composition with Silsesquioxane

The hot melt ink composition was prepared containing 5 parts of silsesquioxane compound from Example 5, 57 parts of carbamic acid, octadecyl, octadecyl ester as viscosity modifier (available from American Dye Source, Inc.), 15 parts of polyamide resin (ADS8530, available from American Dye Source, Inc.), 20 parts of tackifier (Cellolyn 21, from RHO Chemicals), 2.5 parts of solvent black 27 (Sylvanyl NS, available from Clariant) and 0.5 parts of antioxidant (Naugard 431 and 76, available from Uniroyal Chemical). The viscosity of this hot melt ink composition is 13.0 cP at 135° C. The ink was loaded in the Tektronix Phaser 840 printer to print text and image on paper and transparency. The printing text and image show excellent quality and adhere well to the substrate as well as being non-tacky upon touch.

EXAMPLE 17

Hot Melt Ink Composition with Silsesquioxane Containing Aniline Reactive Moiety

The hot melt ink composition was prepared consisting of 4 parts of silsesquioxane compound containing aniline reactive moiety from Example 2, 58 parts of carbamic acid, octadecyl, hexadecyl ester as viscosity modifier (available from American Dye Source, Inc.), 15 parts of polyamide resin (ADS8530, available from American Dye Source, Inc.), 20 parts of tackifier (Cellolyn 21, from RHO Chemicals), 2.5 parts of solvent black 27 (Sylvanyl NS, available from Clariant) and 0.5 parts of antioxidant (Naugard 431 and 76, available from Uniroyal Chemical). The viscosity of this hot melt ink composition is 13.5 cP at 135° C. The ink was loaded in the Tektronix Phaser 840 printer to print text and image on paper and transparency. The printing text and image show excellent quality and adhere well to the substrate as being non-tacky upon touch.

EXAMPLE 18

Hot Melt Ink Composition with Silsesquioxane and Amide-urethane Compound Containing Aniline Reactive Moiety The hot melt ink composition was prepared consisting of 4 parts of silsesquioxane compound containing aniline reactive moiety from Example 2, 15 parts of amide-urethane compound containing aniline reactive moiety from Example 9, 48 parts of carbamic acid, octadecyl, hexadecyl ester as viscosity modifier (available from American Dye Source, Inc.), 10 parts of polyamide resin (ADS8530, available from American Dye Source, Inc.), 20 parts of tackifier (Cellolyn 21, from RHO Chemicals), 2.5 parts of solvent black 27 (Sylvanyl NS, available from Clariant) and 0.5 parts of antioxidant (Naugard 431 and 76, available from Uniroyal Chemical). The viscosity of this hot melt ink composition is 13.8 cP at 135° C. The ink was loaded in the Tektronix Phaser 840 printer to print text and image on paper and transparency. The printing text and image show excellent quality and adhere well to the substrate as well as being non-tacky upon touch.

EXAMPLE 19

Hot Melt Ink Composition with Silsesquioxane and Urethane Compound Containing Aniline Reactive Moiety for Post Polymerization Process.

The hot melt ink composition was prepared consisting of 4 parts of silsesquioxane compound containing aniline moiety from Example 2, 25.5 parts of urethane compound containing aniline moiety from Example 5, 48 parts of carbamic acid, octadecyl, hexadecyl ester (available from American Dye Source, Inc.), 7 parts of polyamide resin (ADS8530, available from American Dye Source, Inc.), 20 parts of tackifier (Cellolyn 21, from RHO Chemicals) and 0.5 parts of antioxidant (Naugard 431 and 76, available from Uniroyal Chemical). The viscosity of this hot melt ink composition is 13.4 cP at 135° C. The ink was loaded in the Tektronix Phaser 840 printer to print several one square inch solid images on a silica coated polyester film (Myraid, available from Xante Corporation. The printed images were dipped into an aqueous solution containing 1.0 molar hydrochloric acid and 1.0 molar ammonium persulfate. After a few minutes, the slight translucent square solid images turned to a uniform slight green color indicating that compound containing aniline reactive moiety undergoes polymerization to form conjugated aniline polymers. The solid image turned to dark green color after 24 hours. The treated images were rinsed with water and dried in air.

EXAMPLE 20

Hot Melt Ink Composition with Silsesquioxane and Urethane-amide Compound Containing Aniline Reactive Moiety for Post Polymerization Process.

The hot melt ink composition was prepared consisting of 4 parts of silsesquioxane compound containing aniline moiety from Example 2, 15.5 parts of urethane compound containing aniline reactive moiety from Example 5, 5 parts of urethane-amide compound containing aniline moiety from Example 9, 50 parts of carbamic acid, octadecyl, hexadecyl ester (available from American Dye Source, Inc.), 5 parts of polyamide resin (ADS8530, available from American Dye Source, Inc.), 20 parts of tackifier (Cellolyn 21, from RHO Chemicals) and 0.5 parts of antioxidant (Naugard 431 and 76, available from Uniroyal Chemical). The viscosity of this hot melt ink composition is 13.7 cP at 135° C. The ink was loaded in the Tektronix Phaser 840 printer to print several one square inch solid images on a silica coated polyester film (Myraid, available from Xante Corporation. The printed images were dipped into an aqueous solution containing 1.0 molar hydrochloric acid and 1.0 molar ammonium persulfate. After a few minutes, the slight translucent square solid images turned to a uniform slight green color indicating that compound containing aniline reactive moiety undergoes polymerization to form conjugated aniline polymers. The solid image turned to dark green color after 24 hours. The treated images were rinsed with water and dried in air.

EXAMPLE 21

Hot Melt Ink Composition with Silsesquioxane and Urethane Containing Pyrrole Reactive Moiety for Post Polymerization Process.

The hot melt ink composition was prepared consisting of 4 parts of silsesquioxane compound containing pyrrole moiety from Example 3, 15.5 parts of urethane compound containing pyrrole moiety from Example 6, 50 parts of carbamic acid, octadecyl, hexadecyl ester as viscosity modifier (available from American Dye Source, Inc.), 10 parts of polyamide resin (ADS8530, available from American Dye Source, Inc.), 20 parts of tackifier (Cellolyn 21, from RHO Chemicals) and 0.5 parts of antioxidant (Naugard 431 and 76, available from Uniroyal Chemical). The viscosity of this hot melt ink composition is 13.2 cP at 135° C. The ink was loaded in the Tektronix Phaser 840 printer to print several one square inch solid images on a silica coated polyester film (Myraid, available from Xante Corporation. The printed images were dipped into an aqueous solution containing 0.5 molar ferric chloride. After a few minutes, the slight translucent square solid images turned to a uniform slight blue color indicating that compound containing pyrrole reactive moiety undergoes polymerization to form conjugated pyrrole polymers. The solid image turned to brownish black color after 24 hours. The treated images were rinsed with water and dried in air.

EXAMPLE 22

Post Polymerization and Copper Deposition Processes.

This example describes a typical post treatment process to deposit a thin layer of copper on the printing images or objects. The printing images obtained from Example 19 were dipped into an aqueous solution containing 1.0 molar hydrochloric acid and 1.0 molar ammonium persulfate. After a few minutes, the slight translucent square solid images turned to a uniform slight green color indicating that compound containing aniline reactive moiety undergoes polymerization to form oxidized aniline polymers. The solid image turned to dark green color after 24 hours. The treated images were rinsed with water and dried in air.

The treated images were then dipped in 1.0 N sodium hydroxide solution, which contained
13.0g/l hydrazinium sulphate. The printing images turned immediately to dark blue and then eventually to grey. It was kept in the solution under nitrogen at room temperature for 24 hours to complete the reduction of aniline polymers. After removed from the reduction solution, the printing images were rinsed with distilled water under nitrogen and immediately dipped into a solution of 1.0 N copper tosylate and 0.01 N dodecyl benzenesulfonic acid having a pH value of around 4.0. The printing images turned to greenish brown color. It was kept in the solution for 5 hours for copper deposition. The printing images were then rinsed with distilled water and dipped into 0.1 N aqueous ammonia solution to remove adherent copper salts. The metallized images were then rinsed with distilled water to produce bronze color images.

EXAMPLE 23

Post Polymerization and Silver Deposition Processes.

This example describes a typical post treatment process to deposit a thin layer of silver on the printing images or objects. The printing images obtained from Example 19 were dipped into an aqueous solution containing 1.0 molar hydrochloric acid and 1.0 molar ammonium persulfate. After a few minutes, the slight translucent square solid images turned to a uniform slight green color indicating that compound containing aniline reactive moiety undergoes polymerization to form oxidized aniline polymers. The solid image turned to dark green color after 24 hours. The treated images were rinsed with water and dried in air.

The treated images were dipped in 1.0 N sodium hydroxide solution, which contained 13.0 g/l hydrazinium sulphate. The printing images turned immediately to dark blue and then eventually to grey. It was kept in the solution under nitrogen at room temperature for 24 hours to complete the reduction of aniline polymers. After removed from the reduction solution, the printing images were rinsed with distilled water under nitrogen and immediately dipped into a solution containing 12.0 g/l of silver nitrate and 0.33 N of p-toluenesulfonic acid having a pH value of around 1.0. After a few minutes, silver deposition on the printing images was recognized. The images were kept in the solution for 3 hours for further silver deposition. The metallized images were then rinsed with distilled water and dried in air.

Although the invention has been described above with respect with one specific form, it will be evident to a person skilled in the art that it may be modified and refined in various ways. It is therefore wished to have it understood that the present invention should not be limited in scope, except by the terms of the following claims.

I claim:
1. A hot melt ink composition comprising in combination:
   (a) a polyhedral silsesquioxane compound present in a proportion of about 0.1 to 30 wt % based on the total weight of the hot melt ink composition
   (b) an ink colorant;
   (c) a resin;
   (d) a tackifier;
   (e) a viscosity modifier.
2. The hot melt ink of claim 1 wherein the ink vehicle also comprises at least one antioxidant.
3. The hot melt ink of claims 1 or 2 wherein the polyhedral silsesquioxane compound is selected from the group of compounds consisting of:

1,3,5,7,9,11,13,15-Octaalkylpentacyclo-[9.5.1.1$^{3,9}$.1$^{5,15}$.1$^{7,13}$]-siloxane, where alkyl is C4–C30 linear, branched or cyclic hydrocarbon chain,
1,3,5,7,9,11,13,15-Octakis(alkyldimethylsilyloxy) pentacyclo-[9.5.1.1$^{3,9}$.1$^{5,15}$.1$^{7,13}$]-siloxane, where alkyl is C4–C30 linear, branched or cyclic hydrocarbon chain, 1,3,5,7,9,11,13,15-Octakis(trimethylsiloxane)propylpentacyclo-[9.5.1.1$^{3,9}$.1$^{5,15}$.1$^{7,13}$]-siloxane, 1,3,5,7,9,11,13,15-Octakis(pentamethyldisiloxane)propylpentacyclo-[9.5.1.1$^{3,9}$.1$^{5,15}$.1$^{7,13}$]-siloxane, 1-(3-(N-anilino)propyl)-3,5,7,9,11,13,15-heptaalkylpentacyclo-[9.5.1.1$^{3,9}$.1$^{5,15}$.1$^{7,13}$]-siloxane, where alkyl is C4–C30 linear, branched or cyclic hydrocarbon chain, 1-(3-(1-pyrrole)propyl)-3,5,7,9,11,13,15-heptaalkylpentacyclo-[9.5.1.1$^{3,9}$.1$^{5,15}$.1$^{7,13}$]-siloxane, where alkyl is C4–C30 linear, branched or cyclic hydrocarbon chain, 1-(3-(2-thienyl)propyl)-3,5,7,9,11,13,15-heptaalkylpentacyclo-[9.5.1.1$^{3,9}$.1$^{5,15}$.1$^{7,13}$]-siloxane, where alkyl is C4–C30 linear, branched or cyclic hydrocarbon chain, 1-(3-(N-diphenylamino)propyl)-3,5,7,9,11,13,15-heptaalkylpentacyclo-[9.5.1.1$^{3,9}$.1$^{5,15}$.1$^{7,13}$]-siloxane, where alkyl is C4–C30 linear, branched or cyclic hydrocarbon chain, 1,3,5,7,9,11,13-octakis(methoxyethoxyethoxyl)propylpentacyclo[9.5.1.1$^{3,9}$.1$^{5,15}$.1$^{7,13}$]-octasiloxane, 1,3,5,7,9,11,13-octakis(methoxypropoxylate)propylpentacyclo[9.5.1.1$^{3,9}$.1$^{5,15}$.1$^{7,13}$]-octasiloxane, 1,3,5,7,9,11,13-octakis(methoxypropyl-1,2-butoxylate-block-ethoxylate)pentacyclo[9.5.1.1$^{3,9}$.1$^{5,15}$.1$^{7,13}$]octasiloxane, 1,3,5,7,9,11,13-octakis(hydroxypropyl-1,2-butoxylate-block-ethoxylate)pentacyclo[9.5.1.1$^{3,9}$.1$^{5,15}$.1$^{7,13}$]octasiloxane, 1-[3-(1,3-propanediol-2-ethyl-2-methoxy)propyldimethylsiloxy]-3,5,7,9,11,13,15-heptacyclopentylpentacyclo-[9.5.1.1$^{3,9}$.1$^{5,15}$.1$^{7,13}$]-octasiloxane, 1-[2-methyl-2-hydroxy)butyldimethylsiloxy]-3,5,7,9,11,13,15-heptacyclopentyl pentacyclo-[9.5.1.1$^{3,9}$.1$^{5,15}$.1$^{7,13}$]-octasiloxane, POSS-Bisphenol A-Urethane polymer, Poly(styrylPOSS-co-styrene), and Poly(dimethyl-co-methylhydrido-co-methylpropylPOSS)siloxane.

4. A hot melt ink comprising a colorant ink and an ink vehicle wherein the ink vehicle comprises:

at least one polyhedral silsesquioxane compound present in a proportion of about 0.1 to 30 wt % based on the total weight of the hot melt ink composition, and molecular, oligomeric or polymeric materials containing reactive moieties allowing polymerization of the materials through cross-linking reactions made to occur after said hot melt ink is jetted onto a substrate, the polymerization being achieved by subjecting the jetted inks to an oxidation treatment by contacting the jetted inks with a suitable oxidizing agent.

5. The hot melt ink of claim 4 wherein the reactive moieties are selected from the group of moieties consisting of: aniline, diphenylamine, pyrrole, thiophene and their substituted derivatives.

6. The hot melt ink of claim 5 wherein the oxidation treatment is conducted by contacting the jetted ink with a solution containing an oxidizing agent selected from the group consisting of: ammonium persulfate, iron chloride and copper perchlorate.

7. An ink vehicle for use in a hot melt ink composition containing an ink vehicle and an ink colorant, the ink vehicle consisting essentially of a polyhedral silsesquioxane compound present in a proportion of about 0.1 to 30 wt % based on the total weight of the hot melt ink composition.

8. The hot melt ink vehicle of claim 7 wherein the ink vehicle also contains at least one antioxidant.

* * * * *